(12) United States Patent
Shnekendorf et al.

(10) Patent No.: US 7,886,166 B2
(45) Date of Patent: Feb. 8, 2011

(54) USER INTERFACE FOR DEMAND SIDE ENERGY MANAGEMENT

(75) Inventors: Edward Shnekendorf, Falls Church, VA (US); Courtney McMahan, Arlington, VA (US); Doug Ferguson, Ashburn, VA (US); Brian Golden, Great Falls, VA (US)

(73) Assignee: GridPoint, Inc., Arlington, VA (US)

( * ) Notice: Subject to any disclaimer, the term of this patent is extended or adjusted under 35 U.S.C. 154(b) by 96 days.

(21) Appl. No.: 12/210,761

(22) Filed: Sep. 15, 2008

(65) Prior Publication Data

US 2009/0077397 A1    Mar. 19, 2009

Related U.S. Application Data

(60) Provisional application No. 60/971,938, filed on Sep. 13, 2007.

(51) Int. Cl.
*G06F 1/26* (2006.01)
(52) U.S. Cl. ........................... 713/310; 713/300
(58) Field of Classification Search .......... 713/300, 713/310
See application file for complete search history.

(56) References Cited

U.S. PATENT DOCUMENTS

| | | | | |
|---|---|---|---|---|
| 5,761,083 A | * | 6/1998 | Brown et al. | 700/296 |
| 6,192,282 B1 | * | 2/2001 | Smith et al. | 700/19 |
| 6,868,292 B2 | * | 3/2005 | Ficco et al. | 700/19 |
| 6,868,293 B1 | * | 3/2005 | Schurr et al. | 700/22 |
| 6,925,361 B1 | * | 8/2005 | Sinnock | 700/286 |
| 7,184,860 B2 | * | 2/2007 | Nakajima et al. | 700/291 |
| 7,206,670 B2 | * | 4/2007 | Pimputkar et al. | 700/291 |
| 7,325,749 B1 | * | 2/2008 | Alexander et al. | 236/78 A |
| 7,343,226 B2 | * | 3/2008 | Ehlers et al. | 700/276 |
| 7,561,977 B2 | * | 7/2009 | Horst et al. | 702/62 |
| 2004/0153170 A1 | * | 8/2004 | Santacatterina et al. | 700/1 |
| 2007/0032908 A1 | * | 2/2007 | Hyland et al. | 700/275 |
| 2009/0102680 A1 | * | 4/2009 | Roos | 340/870.02 |

* cited by examiner

*Primary Examiner*—Nitin C Patel
(74) *Attorney, Agent, or Firm*—Greenberg Traurig LLP

(57) ABSTRACT

A user interface is visibly displayed on a display device operatively connected to a first computer. The user interface enables an end user to enter at least one energy management rule for each of a plurality of electrical loads at a location, each rule including a command to be transmitted to the electrical load associated with the rule if a condition is met. The energy management rules for each of the plurality of electrical loads are received by a second computer. An energy management profile containing the energy management rules for each of the plurality of electrical loads at the location is created and stored using a second computer. The energy management profile is activated using the second computer. For each of the energy management rules where the condition has been met, the command associated with the rule is transmitted to the electrical load associated with the rule.

20 Claims, 7 Drawing Sheets

USER INTERFACE FOR DEMAND SIDE ENERGY MANAGEMENT

This application claims priority to U.S. Provisional Patent Application No. 60/971,938 filed on Sep. 13, 2007, which is incorporated by reference in its entirety herein. This application relates to the subject matter of U.S. patent application Ser. No. 11/968,941 entitled "Utility Console for Controlling Aggregated Energy Resources" filed Jan. 3, 2008, which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of electric power, and in particular to graphical user interfaces for electric power management.

BACKGROUND OF THE INVENTION

The cost of electric power consumption represents a significant expense for the average consumer. It is well known in the field that power consumption can be reduced if power consumption is properly managed, for example, by changing thermostat settings when a building is unoccupied. Managing energy consumption manually is, however, cumbersome, and cannot be performed remotely. Various solutions exist in varying contexts, and in separate and divergent forms. For example, programmable thermostats have existed for years, and some are controllable through a web interface. Remote controlled relay kits also exist in a standalone fashion.

However, none of these elements are treated in a unified fashion within the context of an overarching energy profile which allows for thermostats and device relays to be controlled in concert and on a scheduled or rule-driven basis. While the concept of integrating these components has been considered within the context of utility demand response programs, none of these programs expose either the interface, notion, or control to the end customer, nor do they serve the customer's interests in monitoring and reducing energy usage.

Furthermore, none of the current inventions allow users to manage energy consumption using intuitive interactive graphical widgets such as scalable range sliders, thumb sliders, and directional button controls for the purpose of quickly and easily programming weekly thermostat and circuit schedules; the ease of use and graphical sophistication of this invention is noticeably superior to the current state of art.

SUMMARY OF THE INVENTION

In one embodiment, the invention provides a cohesive, intuitive, and graphically rich consumer interface for demand-side energy management. The interface allows users to construct energy schedules and rule-sets for their thermostats as well as specify 'off' periods for other household circuits on a scheduled and/or rule-driven basis. By allowing users to program their thermostats while also turning off circuits during times that they are not home or when the price of energy reaches or exceeds certain levels, users will realize savings on their energy bills.

In one embodiment, the invention provides a method and computer-readable medium having computer-executable instructions for a method. A user interface is visibly displayed on a display device operatively connected to a first computer. The user interface enables an end user to enter at least one energy management rule for each of a plurality of electrical loads at a location. Each energy management rule comprises a command to be transmitted to the electrical load associated with the rule if a condition is met. The energy management rules for each of the plurality of electrical loads are received by a second computer. An energy management profile is created and stored on a computer readable medium using a second computer. The energy management profile contains the energy management rules for each of the plurality of electrical loads at the location. The energy management profile is activated using the second computer. Each of the energy management rules within the activated energy management profile is evaluated to determine if the condition associated with the rule has been met. For each of the energy management rules where the condition has been met, the command associated with the rule is transmitted to the electrical load associated with the rule.

In one embodiment, the invention is a system. The system includes a first computer enabled to display a user interface on a display device operatively connected to first computer, wherein the user interface enables an end user to enter at least one energy management rule for each of a plurality of electrical loads at a location. Each energy management rule comprises a command to be transmitted to the electrical load associated with the rule if a condition is met. The system further includes a second computer, enabled to receive, over a network, the energy management rules for each of the plurality of electrical loads at the location from the first computer, wherein each of the at least one energy management rules was entered using the user interface. The second computer is further enabled to create an energy management profile stored on a computer readable medium. The energy management profile contains the at least one energy management rule for each of the plurality of electrical loads at the location. The second computer is further enabled to activate the energy management profile. The second computer is further enabled to evaluate each of the at least one energy management rules within the activated energy management profile to determine if the condition associated with the rule has been met. and transmit a command, over the network, for each of the at least one energy management rules where the condition has been met, the command associated with the rule to the electrical load associated with the rule.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 2 shows a graphical illustration of an energy settings interface for selecting an energy profile in accordance with an embodiment of the invention.

FIG. 3 shows a graphical illustration of an energy settings interface for setting energy profile details in accordance with a further embodiment of the invention.

FIG. 5 shows a graphical illustration of an energy settings interface for setting circuit details in accordance with a further embodiment of the invention.

DETAILED DESCRIPTION OF THE PREFERRED EMBODIMENT

Figure 1:
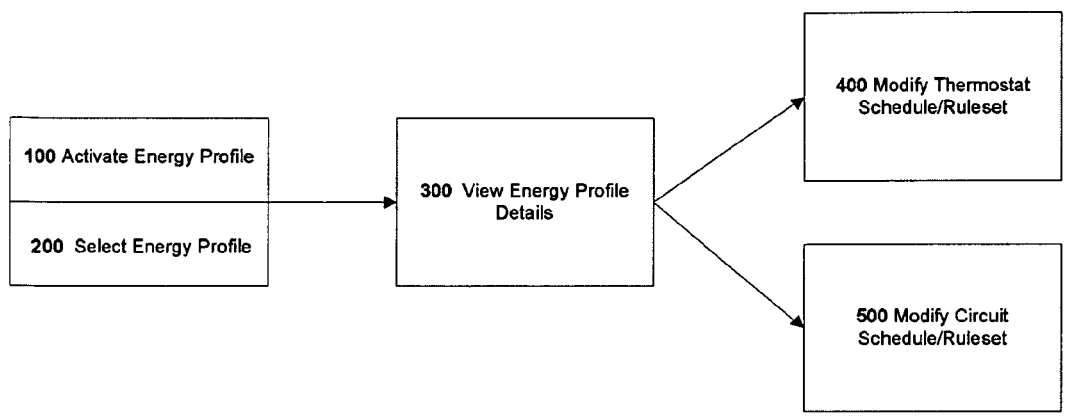
FIG. 1 shows a flow diagram illustrating the basic functions implemented by one embodiment of the system.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

The invention implements a system and user interface for profile based energy management system. The user's interactions are purposefully simple and compact; user interactions are simplified with a high degree of automation. In one embodiment, the invention provides a unified, graphical, consumer-controlled, and web-based interface for monitoring and control of remote circuits and thermostats for the purpose of demand-side energy management, allowing consumers to take control of their energy usage in a way that combines control of multiple thermostats and multiple appliances in their house.

FIG. 1 illustrates the basic functions implemented by one embodiment of the system. Such functions include, e.g., Activate Energy Profile 100, Select Energy Profile 200, View Energy Profile Details 300, Modify Schedule Thermostat Ruleset 400, and, Modify Schedule Circuit Ruleset 500.

In one embodiment the system incorporates seasonal energy profiles that may be scheduled weeks ahead in an intuitive and interactive fashion through a web interface. Energy profiles may be defined based upon the price of electricity or some other type of signal, e.g. notification of a 'code red' air quality day. The invention unifies the monitoring and control of both multiple thermostats and multiple household circuits under the aegis of such energy profiles, allowing consumers to monitor and manage all energy-drawing aspects of their household in a holistic fashion.

In one embodiment, the system is web-based and allows users to manage their energy settings through the Internet or a private network from any location in the world at any time. The invention may use scalable sliders, thumb sliders, directional buttons, and graphically rich iconography to provide a state-of-the art, interactive experience for the consumer. The interactive nature of the interface provides for a more intuitive and faster programming experience than other web-based interfaces for similar purposes available today.

In one embodiment, the system may compute and stores all energy schedules on the server and delivers them to consuming appliances. By centralizing processing on a remote server, the invention is able to provide for a fault tolerant experience where the temporary malfunction of a device does not invalidate the schedule. The invention places the power of utility demand-response programs in the hands of the consumer. It allows the consumer to monitor and control his/her energy usage for his/her own benefit.

In one embodiment, the system may allow a user to define rules for operation which extend beyond clock-driven events, incorporating variables such as minimum/maximum runtime, the price of electricity, the amount/cost of electricity already used in a billing cycle, and other non-temporal factors. The invention may further implement energy recommendations such as programmable set point times and temperatures with seasonal, pre-configured defaults as well as gradual recovery.

Figure 2:
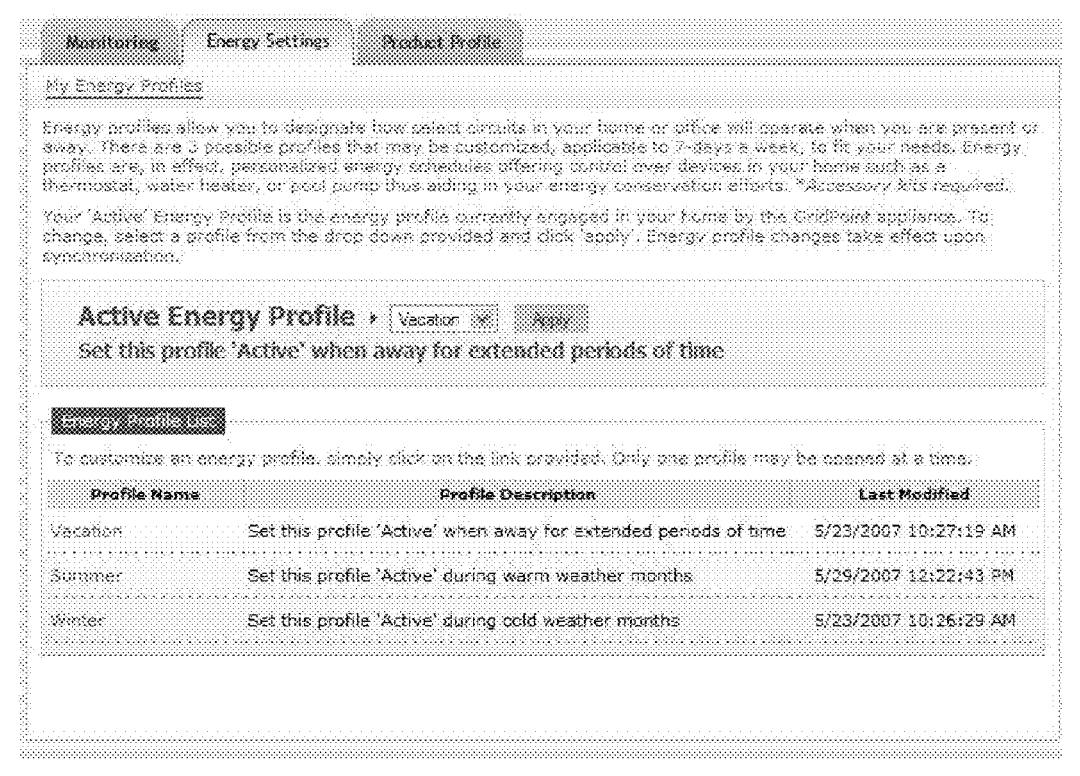

FIG. 2 shows a graphical illustration of an energy settings interface in accordance with an embodiment of the invention. In this embodiment, a user may be initially presented with a view of all available energy profiles. The user has the option of immediately activating a given profile or of drilling down into a given profile to further configure the profile details or the schedules. Activating a profile means that all circuits and thermostats at the user's premises begin acting on previously configured schedules and/or rules associated with that profile.

Figure 3:
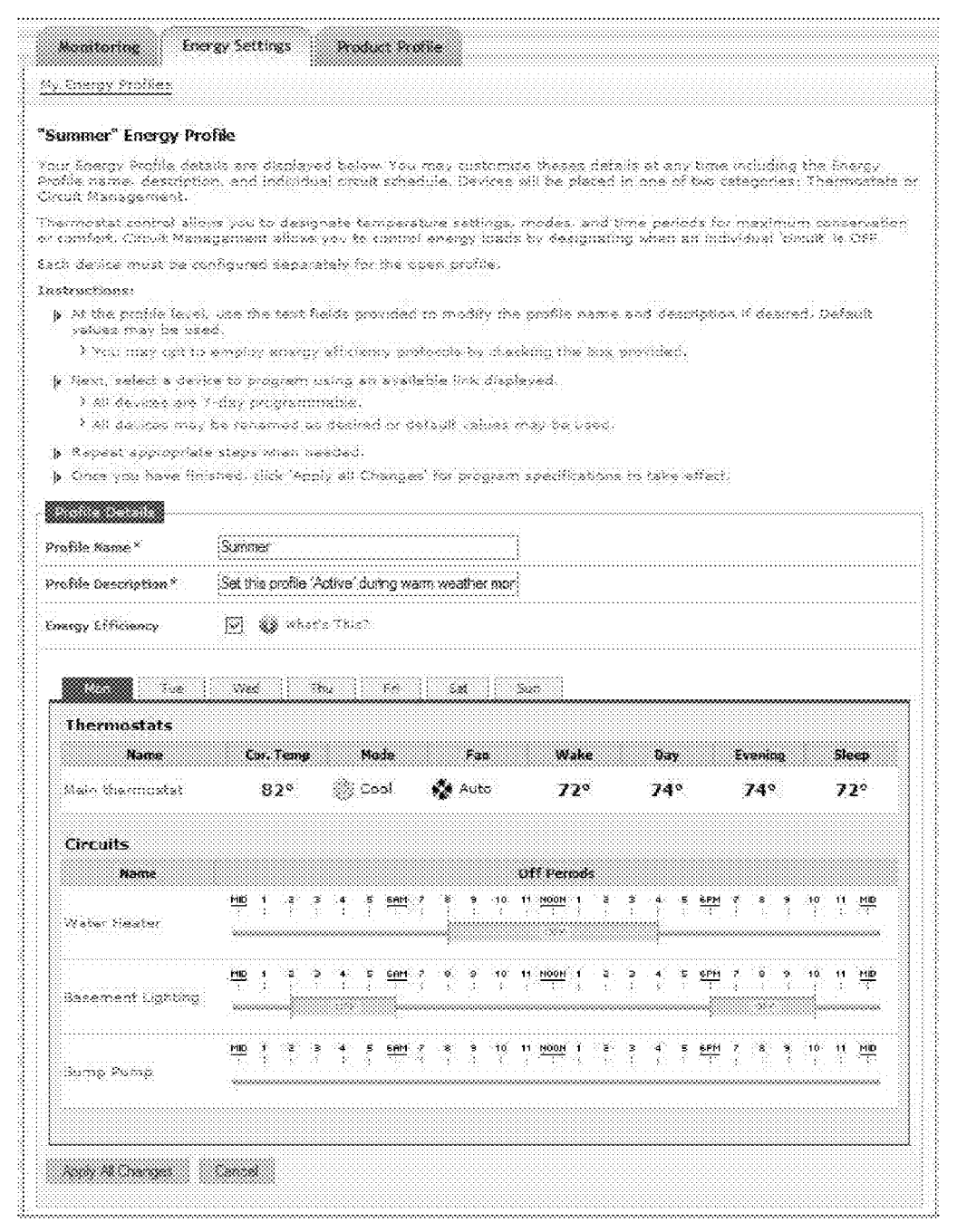

Referring next to FIG. 3, in one embodiment, upon selecting a profile, for example, "summer", the user is presented with a unified, 7-day view of all household elements which may be controlled (in this case, one thermostat and three household circuits). The user is able to see current settings and states for both the thermostats and circuits in a graphical manner. By navigating the tabs, the user is able to easily move between days of the week to see the different schedule/rule settings currently configured for the given profile. To modify schedule or rule settings, the user simply clicks on the name of the device to be updated. From this area, the user is also able to change general profile settings like name and description. An optional energy efficiency option allows users to indicate their desire for energy saving optimizations to be added by the system when this profile is active.

Figure 4:
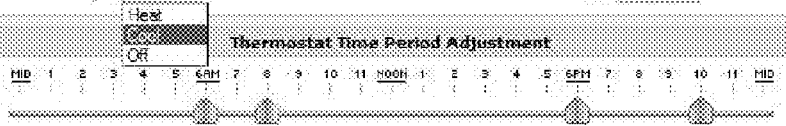
FIG. 4 shows a graphical illustration of an energy settings interface for setting thermostat details in accordance with a further embodiment of the invention.

Referring next to FIG. 4, in one embodiment, upon selecting a thermostat, the user is able to interactively configure the thermostat on a day-by-day basis. Each day is configured with a temperature mode (cool, heat, off) and a fan mode (on, auto). The day is divided into four time periods (wake, day, evening, sleep) by dragging moveable thumb sliders across a 24-hour time scale; the locations of the sliders delineate the four time periods. Directional buttons are used to configure temperature set points for each of the four time periods. Users may use the tabs at the top of the screen to move between days. Additionally, settings may be copied from day to day in a single click by utilizing the Copy settings from widget.

Figure 5:
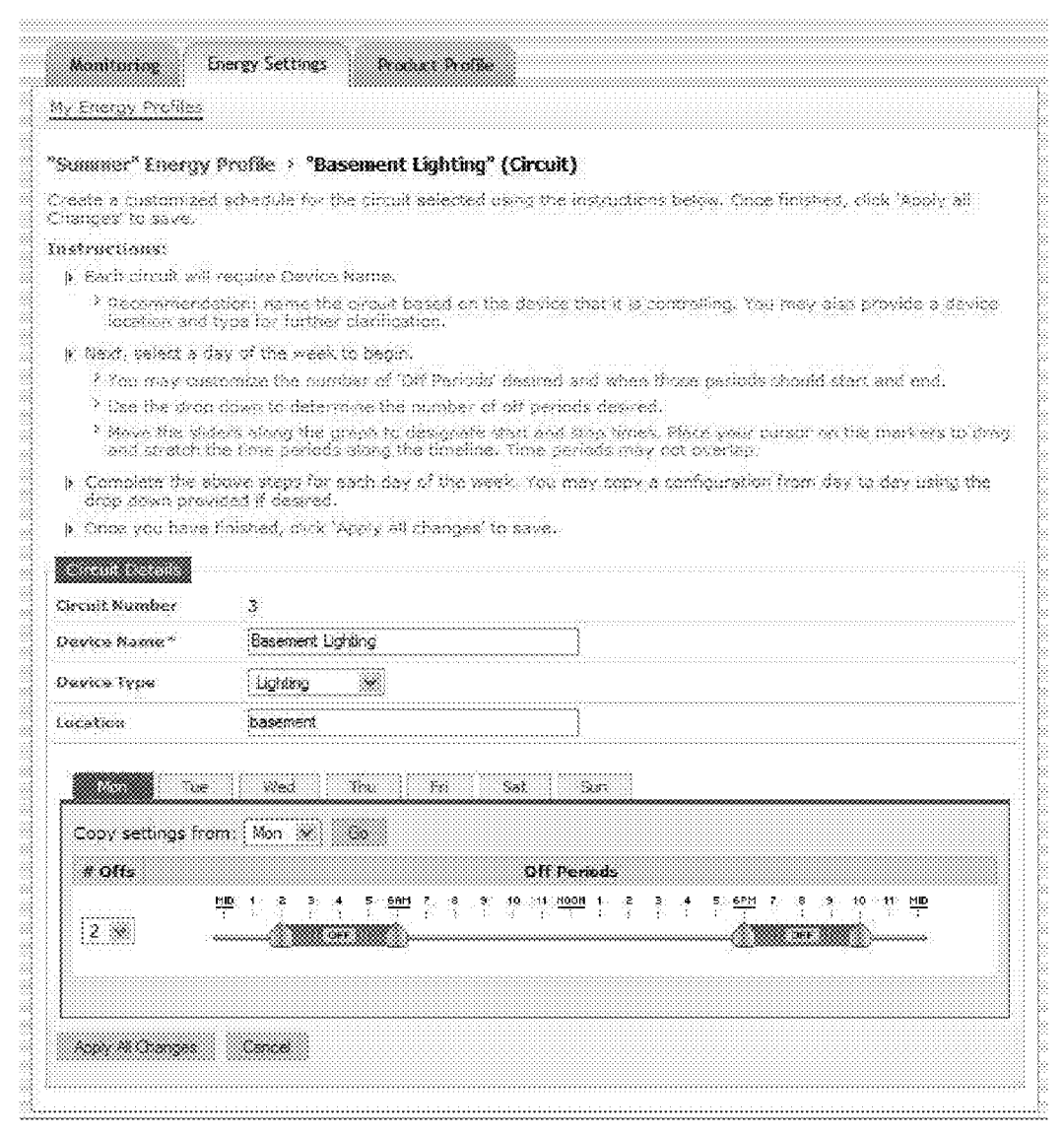

Referring next to FIG. 5, in one embodiment, upon selecting a circuit, the user is able to interactively configure a variable number of off-periods for that circuit on a daily basis. The off-periods are constructed by dragging and/or resizing a range slider across a 24-hour time scale. The number of off-periods can be controlled by adjusting the count in the dropdown list to the left of the slider bar. Another embodiment allows the user to specify a minimum and/or maximum duration the circuit must be on over a given interval of time. Users may use the tabs at the top of the screen to move between days. Additionally, settings may be copied from day to day in a single click by utilizing the Copy settings from widget.

Figure 6:
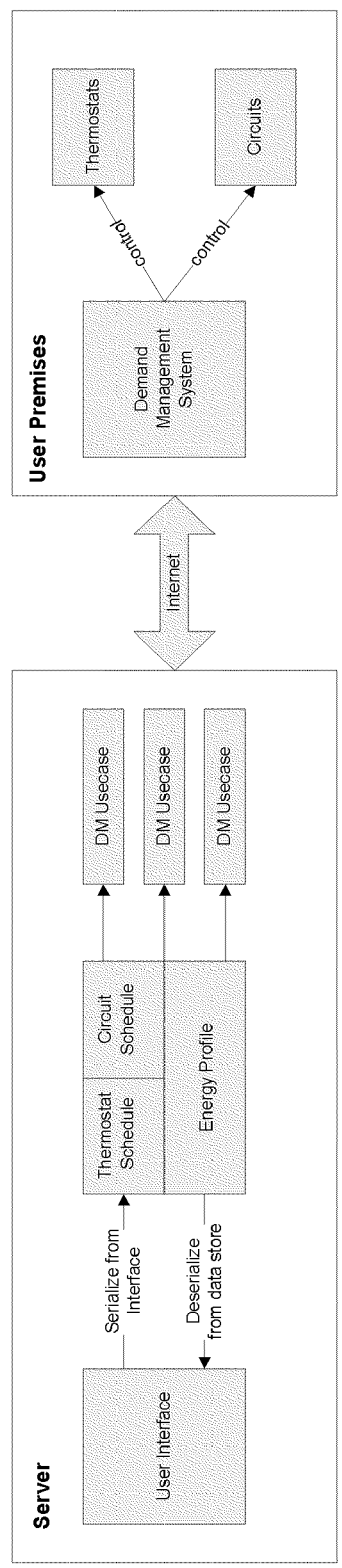
FIG. 6 shows a block diagram illustrating the system of the invention in one embodiment.

FIG. 6 illustrates one embodiment of the behavior of the system from a high-level, system-oriented viewpoint. Moving from left to right in the diagram, the user interacts with the system through the User Interface which provides a unified, graphically-rich experience. As soon as the user saves a schedule, control is handed over to either a thermostat or circuit schedule object. These objects represent the schedule configured by the user and are able to transform themselves into a format understandable by the user interface or a format that may be persisted to a data store for later retrieval. These objects also perform rudimentary validation checking on the schedule and optimize the schedule wherever applicable.

Thermostats and circuit devices may be controlled by a demand management system, for example, the Demand Management (DM) System manufactured by Gridpoint, Inc. of Arlington, Va. This system resides at the user premises and issues native commands to thermostats and circuit relay controllers. The DM system may also receive instructions in the form of multiple use cases generated by a server for one week into the future. The DM System may also report status on its operations back to the server for possible display to end users.

Figure 7:
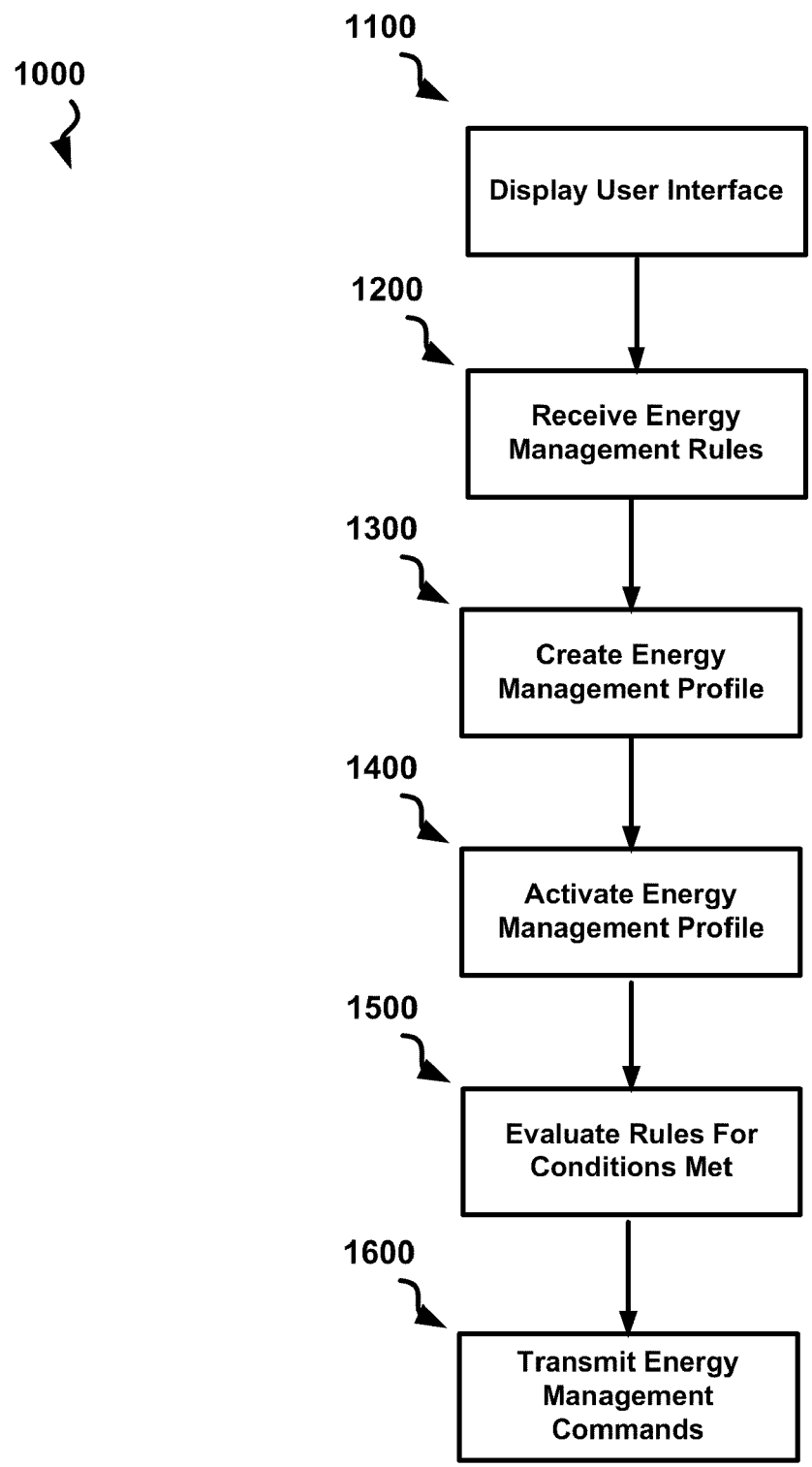
FIG. 7 illustrates a one embodiment of a process 1000 illustrating how one embodiment of the invention can be used to manage plurality of electrical loads at a location.

FIG. 7 illustrates a one embodiment of a process 1000 illustrating how one embodiment of the invention can be used to manage plurality of electrical loads at a location.

Initially, the system causes a user interface to be visibly displayed 1100 on a display device operatively connected to first computer. The first computer can be an end user system, for example, a home computer of a consumer or a on a consumer's laptop. The interface can be a software application implemented on the first computer, or alternatively, can be a browser based interface that is displayed on the display device of the first computer over the Internet.

The user interface enables an end user to enter at least one energy management rule for each of a plurality of electrical loads at a location. The electrical loads can be any type of load that is capable of responding to commands received over a network, which can include electrical circuits and thermostats. The location may be any location accessible over a network, such as the Internet, and could include a consumer's home or a business location, such as a warehouse or a plant. The invention may utilize any network for data transport, including a utility company's Advanced Metering Infrastructure (AMI) network.

Each energy management rule comprises a command to be transmitted to the electrical load associated with the rule if a condition is met. The term "command" should be construed broadly, and encompasses one or more instructions to which an electrical load can respond. For example, commands could include: switch on, switch off, increase power consumption, decrease power consumption, alter the schedule of an electrical device, or set thermostat temperature. A command can comprise a simple or complex program that is downloaded to a programmable device that causes the device to be programmed to implement the energy management rule.

The term "condition" should be construed broadly, and encompasses a simple or complex condition that, in one embodiment, reflects the values of a plurality of measurable variables related by logical operators. For example, the condition could be a threshold price for electricity, which can represent the cost of electricity already used in a billing cycle. In another example, the condition could be a minimum or maximum runtime of the load associated with the rule. In another example, the condition could be a time of day or a date or day of the week. An electrical load can be associated with a set of rules that define a schedule that specifies conditions over a set of non-overlapping time intervals.

Energy management rules entered in using the user interface are then received 1200 at a second computer. The second computer can be a server located at a central location that provides services to a plurality of users, or, alternatively, may be a standalone system where, in one embodiment the first computer and the second computer are the same system.

An energy management profile is then created 1300 using the second computer and is then stored on a computer readable medium. The profile comprises the energy management rules received in step 1200. Multiple profiles can be created for a location, and in one embodiment, each reflects a particular scenario for which a user wishes to have separate energy management rules. In one embodiment, the user interface can be used to display and modify a preexisting energy management profile. The modified energy management rules are then received at the second computer and are used to update the preexisting energy management profile. In one embodiment, a default rule is created for electrical loads for which no rule has been specified and is stored in the energy management profile with all other energy management rules.

The energy management profile is then activated 1400 using the second computer. In one embodiment, activating a profile means that all circuits and thermostats at the location begin acting on previously configured schedules and/or rules associated with that profile. In one embodiment, where a plurality of energy management profiles are stored on the computer readable medium, a second user interface can be visibly displayed on the display device operatively connected to first computer The second user interface enables the end user to view the and select one of the plurality of energy management profiles for activation. The selection is then received by the second computer and determines the energy profile to be activated.

Periodically, or continuously, the second computer, each of the at least one energy management rules within the activated energy management profile are evaluated 1500 to determine if the condition associated with the rule has been met (so long as the profile is active.) Where the condition for a rule has been met, the command associated with the rule is transmitted 1600 over the network to the electrical load associated with the rule. In one embodiment, only one energy management profile may be active for a location at a given time, and only energy management rules associated with the active profile will be evaluated.

In one embodiment all or a subset of the plurality of electrical loads at the location are controlled by a demand management system. The commands associated energy management rules associated electrical loads are transmitted, over the network, to the demand management system. In one embodiment, the commands transmitted to the demand management system comprise a plurality of use cases.

In one embodiment, the power consumption of the plurality of electrical loads at the location are monitored. The power consumption the plurality of electrical loads can then be transmitted to the first computer and displayed on the display device using the user interface.

While the invention has been particularly shown and described with reference to preferred embodiments thereof, it will be understood by those skilled in the art that various changes in form and details may be made therein without departing from the spirit and scope of the invention.

We claim:

1. A method comprising the steps:
   causing a user interface to be visibly displayed on a display device operatively connected to a first computer, wherein the user interface enables an end user to enter at least one energy management rule for each of a plurality of electrical loads at a location, wherein each energy management rule comprises a command to be transmitted to the electrical load associated with the rule if a condition is met;
   receiving at a second computer, over a network, the at least one energy management rule for each of the plurality of electrical loads at a location from the first computer, wherein each of the at least one energy management rules was entered using the user interface;
   creating, using the second computer, an energy management profile stored on a computer readable medium, wherein the energy management profile contains the at least one energy management rule for each of the plurality of electrical loads at the location, wherein the energy management profile allows the plurality of electrical loads at the location to be controlled in concert;
   activating, using the second computer, the energy management profile, wherein each of the plurality of electrical loads at the location begin acting on the associated at least one energy management rule contained in the energy management profile;
   evaluating, using the second computer, each of the at least one energy management rules within the activated energy management profile to determine if the condition associated with the rule has been met;
   transmitting, over a network, for each of the at least one energy management rules where the condition has been met, the command associated with the rule to the electrical load associated with the rule.

2. The method of claim 1 wherein at least a subset of the at least one energy management rules associated with at least one of the plurality of electrical loads define a power management schedule for at least one of the plurality of electrical loads.

3. The method of claim 1 wherein if an energy management rule is not specified for at least one of the plurality of electrical loads, a default rule is created for the at least one of the plurality of electrical loads and is stored in the energy management profile.

4. The method of claim 1 wherein the condition associated with the at least one energy management rule is a time of day, and the command is selected from the set of commands consisting of: switch on, switch off, increase power consumption, decrease power consumption, alter the schedule of an electrical device, alter the schedule of an electrical device, or set thermostat temperature.

5. The method of claim 1 wherein the condition associated with the at least one energy management rule is a minimum or maximum runtime of the load associated with the rule, and the command is selected from set of commands consisting of: switch on, switch off, increase power consumption, decrease power consumption, alter the schedule of an electrical device, or set thermostat temperature.

6. The method of claim 1 wherein the condition is a threshold price for electricity, and the command is selected from the set of commands consisting of: switch on, switch off, increase power consumption, decrease power consumption, alter the schedule of an electrical device, or set thermostat temperature.

7. The method of claim 6 wherein the threshold price of electricity is the cost of electricity already used in a billing cycle.

8. The method of claim 1 wherein at least one of the plurality of electrical loads is a programmable device and the command of the at least one energy management rule associated with the at least one of the plurality of electrical loads is a program that causes the at least one of the plurality of electrical loads to be programmed to implement the at least one energy management rule.

9. The method of claim 1 wherein at least a subset of the plurality of electrical loads are controlled by a demand management system and the commands associated with the at least one energy management rules associated with each of the at least a subset of the plurality of electrical loads are transmitted, over the network, to the demand management system.

10. The method of claim 8 wherein the commands transmitted to the demand management system comprise a plurality of use cases.

11. The method of claim 1 wherein the plurality of electrical loads comprise at least one circuit and at least one thermostat.

12. The method of claim 1 wherein the network is the Internet and the user interface is web-based.

13. The method of claim 1 wherein the first computer and the second computer are the same computer.

14. The method of claim 1 additionally comprising the steps of:
   monitoring, over the network, the power consumption of the at least one of the plurality of electrical loads at the location;
   transmitting, over the network, the power consumption of the at least one of the plurality of electrical loads to the first computer;
   causing the power consumption of the at least one of the plurality of electrical loads to be displayed on the display device using the user interface.

15. The method of claim 1 wherein a plurality of energy management profiles are stored on the computer readable medium comprising the additional steps of:
   causing a second user interface to be visibly displayed on the display device operatively connected to the first computer, wherein the second user interface enables the end user to view the energy management profiles and select one of the plurality of energy management profiles;

receiving a selection from the end user, over the network, of a selection of one of the plurality of energy management profiles, wherein the selected one of the plurality of energy management profiles is activated in the activating step.

16. A non-transitory computer-readable medium having computer-executable instructions for a method comprising the steps of:

causing a user interface to be visibly displayed on a display device operatively connected to a first computer, wherein the user interface enables an end user to enter at least one energy management rule for each of a plurality of electrical loads at a location, wherein each energy management rule comprises a command to be transmitted to the electrical load associated with the rule if a condition is met;

receiving at a second computer, over a network, the at least one energy management rule for each of the plurality of electrical loads at a location from the first computer, wherein each of the at least one energy management rules was entered using the user interface;

creating, using the second computer, an energy management profile stored on a computer readable medium, wherein the energy management profile contains the at least one energy management rule for each of the plurality of electrical loads at the location, wherein the energy management profile allows the plurality of electrical loads at the location to be controlled in concert;

activating, using the second computer, the energy management profile, wherein each of the plurality of electrical loads at the location begin acting on the associated at least one energy management rule contained in the energy management profile;

evaluating, using the second computer, each of the at least one energy management rules within the activated energy management profile to determine if the condition associated with the rule has been met;

transmitting, over a network, for each of the at least one energy management rules where the condition has been met, the command associated with the rule to the electrical load associated with the rule.

17. A system comprising:

a first computer enabled to display a user interface on a display device operatively connected to the first computer, wherein the user interface enables an end user to enter at least one energy management rule for each of a plurality of electrical loads at a location, wherein each energy management rule comprises a command to be transmitted to the electrical load associated with the rule if a condition is met;

a second computer, enabled to receive, over a network, the at least one energy management rule for each of the plurality of electrical loads at the location from the first computer, wherein each of the at least one energy management rules was entered using the user interface, wherein the second computer is further enabled to create an energy management profile stored on a computer readable medium, wherein the energy management profile contains the at least one energy management rule for each of the plurality of electrical loads at the location, wherein the energy management profile allows the plurality of electrical loads at the location to be controlled in concert, wherein the second computer is enabled to activate the energy management profile, wherein each of the plurality of electrical loads at the location are enabled to begin acting on the associated at least one energy management rule contained in the energy management profile, wherein, the second computer is enabled to evaluate each of the at least one energy management rules within the activated energy management profile to determine if the condition associated with the rule has been met, and wherein the second computer is enabled to transmit a command, over the network, for each of the at least one energy management rules where the condition has been met, the command associated with the rule to the electrical load associated with the rule.

18. The system of claim 17 wherein at least a subset of the at least one energy management rules associate with at least one of the plurality of electrical loads define a power management schedule for at least one of the plurality of electrical loads.

19. The system of claim 17 wherein if an energy management rule is not specified for at least one of the plurality of electrical loads, a default rule is created for the at least one of the plurality of electrical loads and is stored in the energy management profile.

20. The system of claim 17 wherein the condition associated with the at least one energy management rule is a time of day, and the command is selected from the set of commands consisting of: switch on, switch off, increase power consumption, decrease power consumption, alter the schedule of an electrical device, or set thermostat temperature.

* * * * *